Sept. 4, 1934. C. GOTTWALD Re. 19,302
WATER REPELLENT PACKING MATERIAL AND CONDUIT
Original Filed Aug. 12, 1927
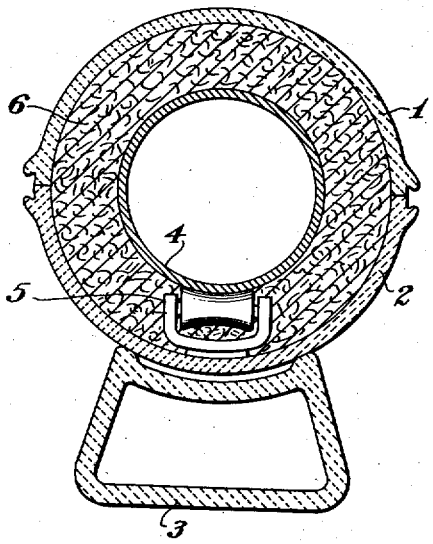
Christian Gottwald INVENTOR.
BY
Hauwood and Van Horn
ATTORNEYS Reissued Sept. 4, 1934

Re. 19,302

UNITED STATES PATENT OFFICE 19,302

WATER REPELLENT PACKING MATERIAL AND CONDUIT

Christian Gottwald, Cleveland Heights, Ohio, assignor to The Ric-Wil Company, Cleveland, Ohio, a corporation of Ohio Original No. 1,801,500, dated April 21, 1931, Serial No. 212,502, August 12, 1927. Application for reissue August 8, 1931, Serial No. 556,038

4 Claims. (Cl. 154—44)

The present invention relates to an improvement in underground conduit systems, in which a pipe or pipes for conveying a liquid or gas are housed within an enveloping structure of metal, tile, concrete or brick.

The invention has particularly to do with the matter of packing for surrounding the pipe or pipes within the housing or envelope, the packing having the peculiar property of repelling water, so that the same will not become water-soaked, and thus break down its quantities as a thermo non-conductor.

Reference should be had to the accompanying drawing forming a part of this specification, in which the figure shows, in cross section, a well known form of underground conduit construction with the thermo non-conducting packing surrounding the enclosed pipe.

In the drawing, 1 and 2 designate the upper and lower portions of a well known form of conduit, usually made of vitreous material. A well known form of base drain is indicated at 2.

Within the conduit is a pipe 4 for fluid conducting purposes, which pipe is supported upon supports 5 which are of a well known commercial form.

Surrounding the pipe and confined within the conduit is the thermo non-conducting packing material to which reference is made later on in this specification.

Underground conduit systems are prone to have moisture accumulate within the outer casing or conduit, either because of moisture condensing, or in some instances from the ingress of water from the outside.

It is usual in underground conduit systems to provide some sort of draining feature, both to drain water from the surrounding earth in which the conduit is placed, and also to provide suitable vents or means by which water that may accumulate or find its way into the conduit itself may be drained.

In underground conduit systems where the pipe or pipes are conveying a liquid or gas which is either above or below the normal temperature, as for instance steam, or on the other hand a refrigerant gas or fluid, it is necessary to enclose and pack the pipe or pipes with some suitable non-conductor of heat. The difficulty has been that the usual forms of thermo non-conductors become impregnated with water or moisture, and thus decrease, and with the accumulation of sufficient moisture break down the thermo non-conductivity of the packing. The usual packings which have heretofore been employed, such as shredded asbestos, rock wool and mineral wool are in each instance comprised of siliceous fibers which of themselves are water proof. These substances being crystalline in structure and not cellular will not absorb water, so that they may be properly described as water-proof. However, when these substances are used as packing materials in underground conduit systems, the water which condenses within the conduit or finds its way into the conduit from outside sources will nevertheless soak the fibrous mass, the water finding its way into the interstices between the fibers and there being held, and upon a sufficient accumulation of water the thermo non-conductivity of the packing mass is impaired or destroyed. Apparently the water penetrates into the mass of fibers by capillarity and lodges in the interstices between the fibers, and this will occur even though care is taken to sufficiently pack the fibrous mass so as to avoid leakage or appreciable pockets in the packing.

The present invention has to do with a packing material, which, by treatment, is rendered water repellent, and by this is meant that water coming in contact with a mass of fibers is repelled, so that the water does not find its way into the interstices between the fibers.

More specifically speaking a fibrous packing material, such as shredded asbestos, rock wool, mineral wool or equivalent material which in usual commercial form is unmatted and having loosely associated fibers which, in itself, is water-proof, is treated by chemicals so as to render the fibers water repellent, and when a mass of unmatted, loosely associated fibers of material so treated is loosely packed around a pipe or pipes within a conduit, the density of the packing being such as to avoid appreciable sized pockets or spaces in the packing, water coming in contact with the mass of fibrous material will be repelled and the water will run down the inner wall of the enveloping conduit to be discharged through the usual base drain. The effect of the treatment given to the fibers of the fibrous material seems to be in effect to break down the usual capillary action, by which water might ordinarily be drawn into the interstices between the fibers, and by virtue thereof the water is repelled. Whether the foregoing be the correct explanation of the phenomena is not important, but the fact that the fibers are rendered repellent to water is important.

The fibrous material may be treated to render it water repellent by various substances, one of which may be mentioned, being aluminum stearate which chemically is known as an insoluble soap, as set forth in a book entitled "Soaps" by Geo. H. Hurst (3rd edition) at page 18, and a book entitled "Industrial and Manufacturing Chemistry" (6th edition) by Jeffry Martin, page 101.

I am aware that it has been heretofore proposed to treat certain material which is cellular in nature in order to make it water-proof, but my invention differs from such procedure in that it makes the fibrous material treated water repellent.

Merely being water-proof is not sufficient for, as before pointed out, asbestos, rock wool and mineral wool are all inherently water-proof, but nevertheless a fibrous mass of these materials will watersoak by the accumulation of water in the interstices between the fibers.

It is only by making the fibers water repellent so that water will not accumulate in the interstices between the fibers, that an efficient packing for underground pipes which are housed in conduits can be obtained.

Having thus described my invention what I claim as new is:

1. The combination with a conduit having drainage means and a fluid conducting pipe therein, of a mass of thermo non-conducting material comprising a mass of unmatted and comparatively loosely associated mineral fibers coated with material which renders them water repellent, surrounding said pipe and within the conduit.

2. The combination with a conduit having drainage means and a fluid conducting pipe therein, of a mass of thermo non-conducting material comprising a mass of unmatted comparatively loosely associated asbestos fibers coated to render them water repellent surrounding said pipe and within the conduit.

3. The combination with a conduit, of a pipe extending through said conduit and adapted to conduct fluid, and unmatted water repellent fibrous mineral material loosely compacted within said conduit and closely surrounding said pipe.

4. The combination with a conduit, of a pipe extending through said conduit and adapted to conduct fluid, and a mass of unmatted asbestos fibers rendered substantially water repellent in bulk and loosely compacted within said conduit to entirely surround said pipe.

CHRISTIAN GOTTWALD.